Nov. 23, 1937. W. H. HUNTER 2,099,691
SPIRAL PACKED WORKING BARREL VALVE BODY
Filed Sept. 3, 1936   3 Sheets-Sheet 1
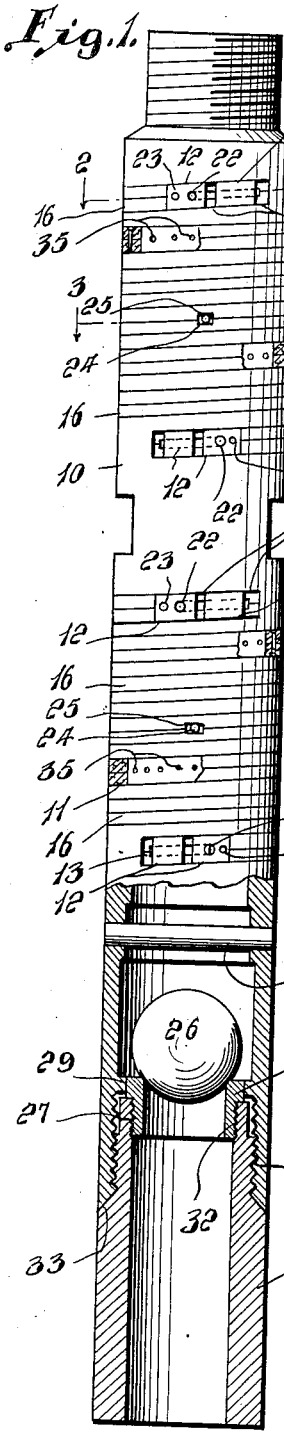
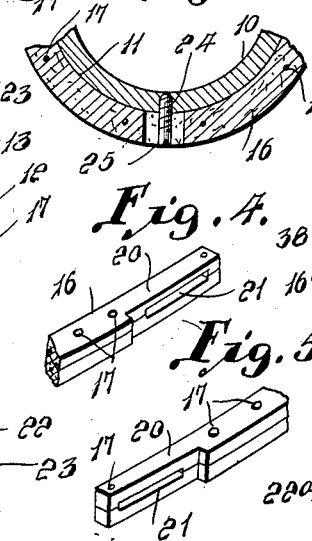
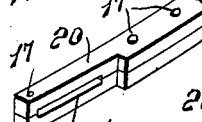
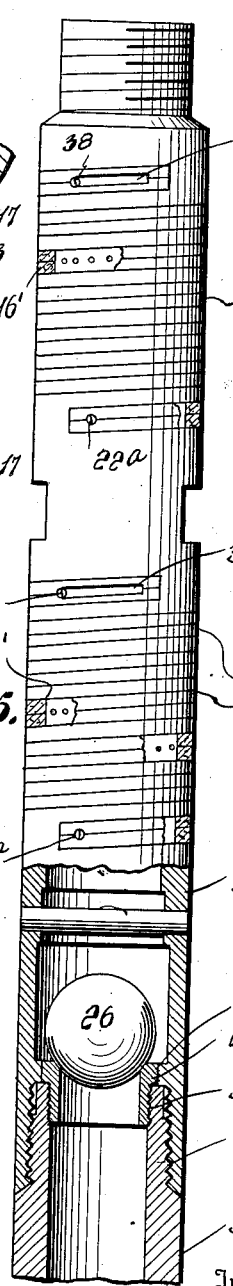
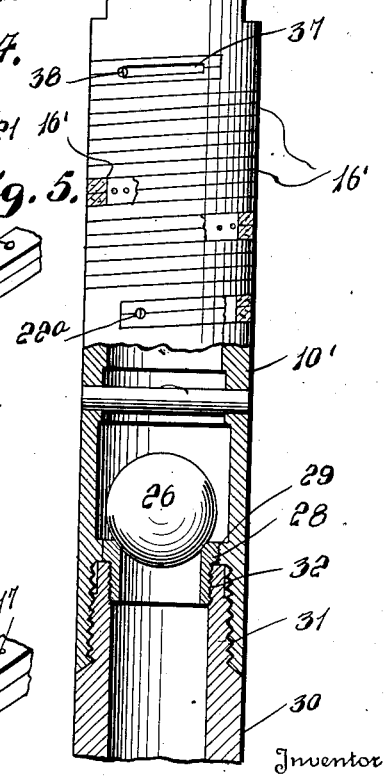
Inventor
W. H. Hunter Nov. 23, 1937.  W. H. HUNTER  2,099,691
SPIRAL PACKED WORKING BARREL VALVE BODY
Filed Sept. 3, 1936  3 Sheets-Sheet 2
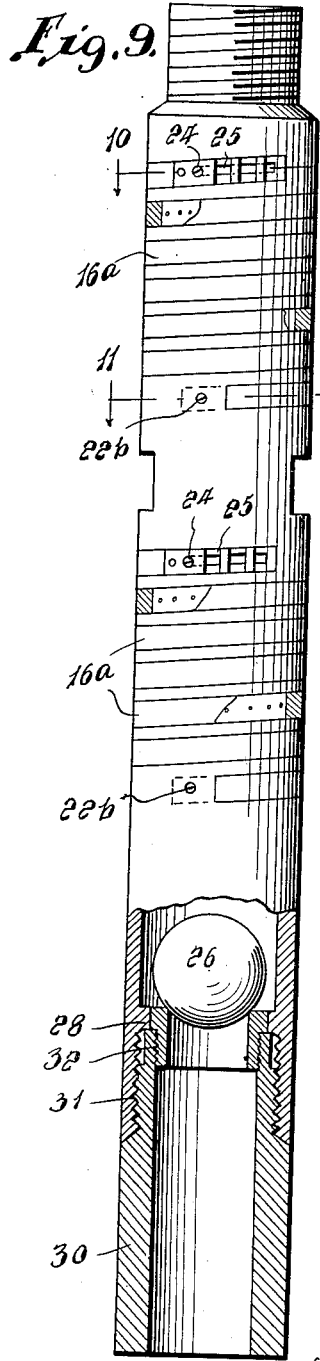
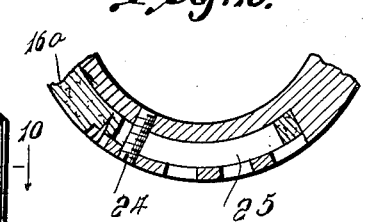
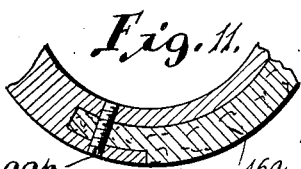
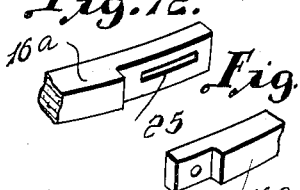
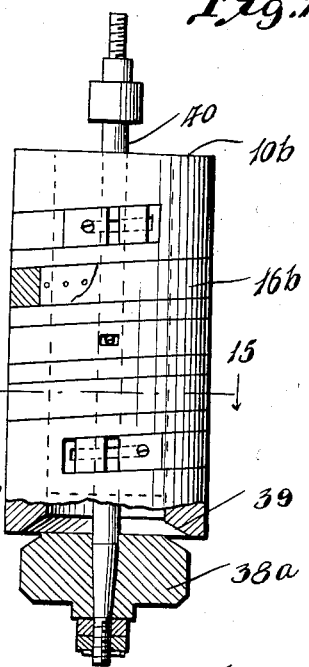
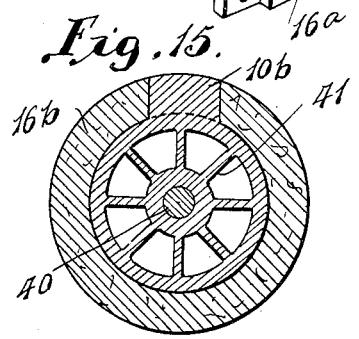
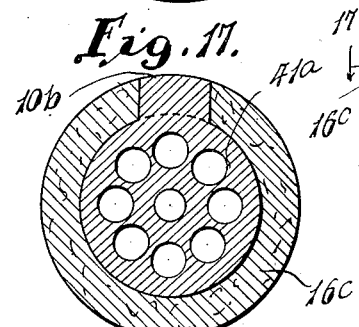
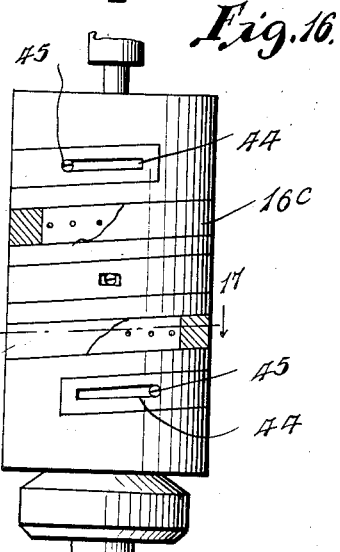
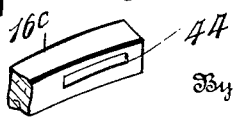
Inventor
W. H. Hunter
By L. F. Randolph
Attorney Nov. 23, 1937.   W. H. HUNTER   2,099,691
SPIRAL PACKED WORKING BARREL VALVE BODY
Filed Sept. 3, 1936    3 Sheets-Sheet 3
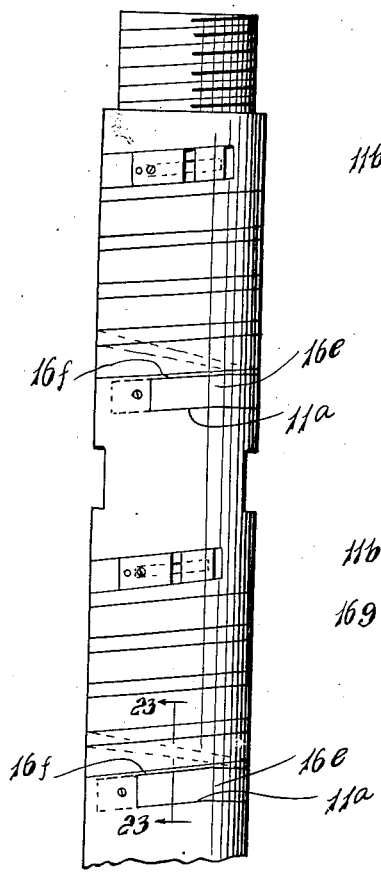
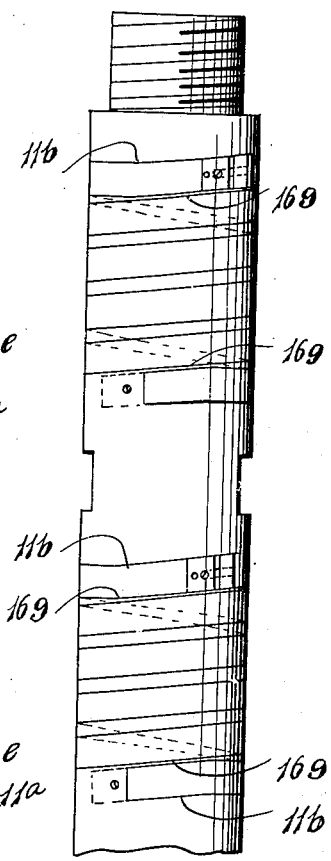
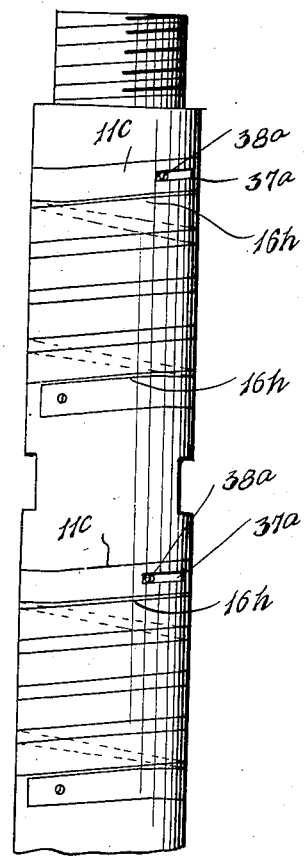
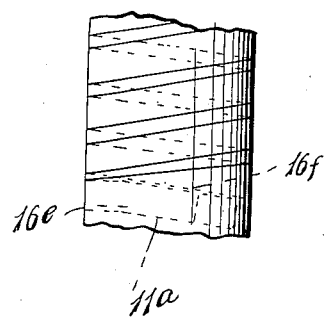
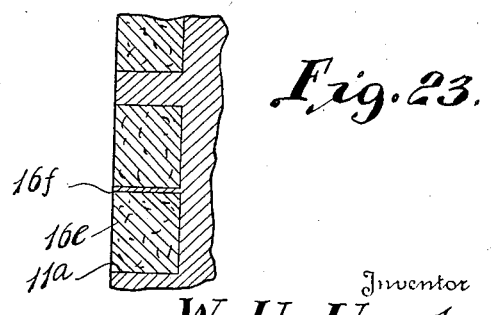
Inventor
W. H. Hunter
By
Attorney Patented Nov. 23, 1937

2,099,691

UNITED STATES PATENT OFFICE 2,099,691

SPIRAL PACKED WORKING BARREL VALVE BODY

William H. Hunter, Webb City, Mo.

Application September 3, 1936, Serial No. 99,297

8 Claims. (Cl. 103—225)

This invention relates to a valve body for working barrels of the kind used in lift or beam or any type of hydraulic plunger pumps and it generally aims to provide a novel packing means of the general character disclosed in my co-pending application Serial No. 61,604 filed January 30, 1936, and more specifically aims to provide a construction which is improved thereover and which will be effective at all times, will automatically compensate for wear and be capable of expeditious application.

The more specific objects and advantages will become apparent from a consideration of the description following taken in connection with accompanying drawings illustrating an operative embodiment.

In said drawings:—

Figure 1 is a view, partly in elevation and partly in section, of a working barrel valve body constructed in accordance with the invention;

Figure 2 is a horizontal sectional view taken on the line 2—2 of Figure 1;

Figure 3 is a horizontal sectional view taken on the line 3—3 of Figure 1;

Figure 4 is a detail perspective view of the upper end of one of the packing elements;

Figure 5 is a detail perspective view of the lower end of one of the packing elements;

Figure 6 is a view partly in side elevation and partly in section taken through a modified form;

Figure 7 is a detail perspective view of the upper end of the packing strip used in the form of Figure 6;

Figure 8 is a detail perspective view of the lower end of the last mentioned packing strip;

Figure 9 is a view partly in side elevation and partly in section through another form of working barrel valve body equipped with my improvements;

Figure 10 is a horizontal sectional view taken on the line 10—10 of Figure 9;

Figure 11 is a horizontal sectional view taken on the line 11—11 of Figure 9;

Figure 12 is a detail perspective view of the upper end of the packing strip used in the form of Figure 9;

Figure 13 is a detail perspective view of the lower end of the packing strip used in the form of Figure 9;

Figure 14 is a view in side elevation and in section, showing a further form of working barrel valve body;

Figure 15 is a detail section taken on the line 15—15 of Figure 14;

Fig. 16 is a side elevation of still another form of working barrel valve body;

Figure 17 is a detail section taken on the line 17—17 of Figure 16;

Figure 18 is a detail perspective view of one end of the packing strip used in the form of Figure 16;

Figures 19, 20 and 21 are fragmentary elevational views of modified forms of still further modified forms of the valve body;

Figure 22 is a fragmentary reverse side of the working valve body of any of the Figures 19, 20 and 21, and Figure 23 is an enlarged sectional view on a plane indicated by the line 23—23 of Figure 19.

Referring specifically to the drawings wherein like reference characters designate like or similar parts, 10 designates a working barrel valve body of any desired size or kind, for a conventional lift, beam or hydraulic plunger pump in accordance with my invention. The exterior of such valve body 10 is provided with one or more spiral grooves 11 of any desired extent and preferably square in cross section as shown. Such grooves at the opposite ends are overlapped by straps 12, of any desired number, spaced apart as shown at 13, such straps for instance being welded to the body 10 with the exterior thereof flush with the periphery of the body, and the straps being thinner than the depth of the grooves 11. The openings at 13, or spaced between the straps 12, permit the escape of sand or the like.

Fitting said grooves 11 normally flush with the periphery of the body 10, are packing strips 16. Said strips are preferably square in cross section and are of any suitable flexible or yieldable packing material, for instance being molded in one piece or composed of a plurality of sheets or plies riveted together at intervals as at 17 to prevent separation. Such plies may be of textile fabric or they may be of such fabric impregnated with rubber.

At the opposite ends, strips 16 have reduced portions or tongues 20, provided with elongated slots 21. Screws 22 pass through the straps 12 and slots 21 and are screwed into the body 10 proper. Initially the innermost end walls of the slots 21 are in contact with screws 22 and a pin 23 may pass through registering openings in a strap 12 and tongue 20. This pin 23 is relatively frail so as to be fractured or broken through expansion and elongation of the packing strip.

Fastened in the grooves 11, midway of the ends of the grooves, are pins 24 engaged by slots or openings 25 of the packing strips 16, preferably enlarged somewhat with respect to the pins.

The purpose of pin 24 is to keep the packing strip from moving lengthwise of the groove. This equalizes the expansion or contraction of each end of the packing strip. The opening 25 through the packing strip is somewhat larger than pin 24 which permits the packing to move outwardly to engage the walls of the working barrel as the packing or working barrel wears, and as the packing wears the ends of the packing move toward pin 24 or toward the center of the length of the groove until the outermost ends of the slots come in contact with screws 22.

The barrel 10 is preferably of that type which has a ball valve located therein at 26, seated on a seat member 27 having an outwardly extending flange 28 engaging an inwardly extending flange 29 on the valve body and which flange 28 rests on the upper end of a tubular section 30, screw threaded at 31 to the valve body 10 and to which the seat member 27 is screw threaded as at 32. The joint between the lower end of the valve body 10 and the section 30 is along an inclined plane as shown at 33. It will be noted that the interior of the valve body 10 adjacent the ball valve 26 is appropriately stepped or reduced to coact therewith and that a pin 34 is provided radially of the valve body 10 to prevent undue upward movement or lifting of the ball valve 26.

It is to be noted that any suitable number of openings, usually radial, are provided through the valve body 10 communicating with the bore thereof and with the bases of the grooves 11, as at 35.

In the operation of the device, the valve 26 coacts therewith to retain fluid in the valve body 10 to thereby create hydrostatic pressure and that such pressure, due to the communication between the bore of the body and the inner surfaces of the packing, through the medium of the openings 35, the pressure acts to expand such packing 16.

In many cases, it is unnecessary to employ the pins 23. They are only employed in positioning the device, to hold the packing retracted or in non-interfering position and usually, especially in the case of small size valve bodies, friction alone on the part of the reduced portions or tongues 20 with the straps 12 or bases of the grooves 11 will hold the ends of the packing against slippage or movement while being positioned.

However when the pins 23 are employed, such pins will be fractured through the hydrostatic pressure mentioned so that the packing may move in the grooves 11, to the extent permitted by the length of the slots 21. In some instances the packing to some extent absorbs the liquid. In addition, the action from the hydrostatic pressure incident to operation passing through the openings 35, maintains the packing in effective engagement with the cylinder or working barrel for the body 10, such packing being drawn toward the pins 24 automatically, as required, to take up wear.

A modified form of the invention is shown in Figure 6 which differs from the preceding form in the following particulars. A packing strip here designated 16' is not reduced at its ends. One of such ends is fastened by means of a pin 22ª to the body here designated 10' and its other end has an elongated slot 37 through which a pin 38 passes, being initially engaged with the innermost end wall of such slot. It will be understood that the pin 38 is an anchor or dowel pin and serves to stop wear and expansion of the packing strip. The packing strips 16' function like those at 16. However, the strip does not contract or move toward the center but moves from one end toward the end anchored at 22ª, to the extent permitted by the slot 37.

The pins 38 serve the same purpose as the screws that are used as at 22.

Another modified form is shown in Figure 9 which differs from the form of Figure 1 in that the pins 24 and slots 25 are omitted and, instead of both ends of the packing strip here designated 16ª being fastened similarly to Figure 1, has only the upper end so fastened and the lower end anchored by means of screw 22ᵇ, corresponding to that at 22ª in Figure 6.

In the form of Figures 14 and 15, the body is designated 10ᵇ and the packing strip and its connections thereto, suggested at 16ᵇ is identical with the structure of Figure 1. In lieu of the ball valve employed in the form of Figure 1, a valve 38 is employed to coact with a beveled seat 39 at the lower end of the body 10ᵇ. Valve 38 is carried by a stem 40 adapted for connection to a plunger, sucker rod or the like. The interior of the body 10ᵇ is hollow and provided with webs 41 as best shown in Figure 15.

In the remaining form of the invention shown in Figures 16, 17 and 18, the structure is the same as in Figures 14 and 15 except the valve body has webs 41ª of a different form. In addition, the packing strip 16ᶜ, corresponds to that at Figure 14, being anchored at the center by a pin and enlarged slot as shown, as in Figure 1, but having the ends provided with elongated slots 44 engaged with pins 45 carried by the body, such pins being initially engaged by the inner end walls of the slots 44 and permitting movement of the packing to the extent of the length of the slots 44, to compensate for wear.

Other modifications of any of the forms described may be resorted to particularly as shown in Figures 19, 20 and 21. In the form of Figure 19, it agrees with that of Figure 9 except the lower extremities of the grooves here designated 11ª, rather than 11 as in the previous forms, is at a different angle from the remainder of such grooves and communicates with the lower convolution thereof to the end that the lower ends 16ᵉ will contact at the edge thereof as at 16ᶠ with the adjacent convolution of the packing to more effectively prevent leakage around the spiral ring.

In Figure 20, the same feature of Figure 19 is embodied and in addition, the upper terminal 11ᵇ, of the groove designated 11 in the previous figures, is disposed at an angle to the remainder of the groove so as to communicate with the upper convolution of the groove to secure edge contact as at 16ᵍ between the upper terminal of the packing and the upper convolution, to more effectively prevent leakage around the spiral ring.

In the form of Figure 21, the lower terminals of the grooves and packing are constructed as in Figures 19 and 20 and the upper terminal of the packing as at 11ᶜ, contacts with the adjacent convolution at 16ʰ as in Figure 20. However, in lieu of fastening the upper extremities or terminals of the packing as in Figure 20, the same is secured by means of elongated slots 37ª and 38ª as in Figure 6.

Various other modifications may be resorted to within the spirit and scope of the invention.

I claim as my invention:—

1. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and means midway of the terminals of the packing so that the packing will move substantially equally on opposite sides of such means.

2. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and means midway of the terminals of the packing so that the packing will move substantially equally on opposite sides of such means, and spaced apart straps across the groove adjacent one end thereof to frictionally engage and overlap the packing.

3. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and means midway of the terminals of the packing so that the packing will move substantially equally on opposite sides of such means, and spaced apart straps across the groove adjacent one end thereof to frictionally engage and overlap the packing, the ends of the packing having elongated slots, and screws carried by the body and disposed in said slots.

4. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and spaced apart straps across the groove adjacent one end thereof to frictionally engage and overlap the packing.

5. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and spaced apart straps across the groove adjacent one end thereof to frictionally engage and overlap the packing, the last mentioned end of the packing having an elongated slot, and a screw carried by one of the straps disposed in said slot.

6. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and means midway of the terminals of the packing so that the packing will move substantially equally on opposite sides of such means, a body section, said body section being screw-threaded to the lower end of the body, a valve seat supported by said section within the body, a ball valve engaged with said seat, and a pin disposed within the body above said valve.

7. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and a pin and slot connection between the strip and body located intermediate the terminals of the packing.

8. A valve body provided with a valve which retains fluid in said body to thereby create hydrostatic pressure, said body having a substantially spiral groove, a strip of packing disposed in said groove, said valve body having openings leading to said groove through which said pressure acts to expand said packing, and means located between the terminals of the packing so that the packing will move substantially equally on opposite sides of such means.

WILLIAM H. HUNTER.